US008717756B2

(12) United States Patent
Ito et al.

(10) Patent No.: US 8,717,756 B2
(45) Date of Patent: May 6, 2014

(54) ELECTRONIC DEVICE

(75) Inventors: Naoyuki Ito, Osaka (JP); Kazuhiro Shiraga, Osaka (JP); Shinji Goto, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 129 days.

(21) Appl. No.: 13/544,936

(22) Filed: Jul. 9, 2012

(65) Prior Publication Data
US 2013/0016473 A1    Jan. 17, 2013

(30) Foreign Application Priority Data

Jul. 11, 2011 (JP) .................................. 2011-153049
May 25, 2012 (JP) .................................. 2012-120104

(51) Int. Cl.
*G06F 1/20* (2006.01)
*H05K 7/20* (2006.01)

(52) U.S. Cl.
USPC ................. 361/679.47; 361/695; 361/679.48; 361/679.54; 361/679.55; 361/697; 361/703; 361/704; 174/16.3

(58) Field of Classification Search
USPC .............. 174/15.2, 16.3; 361/679.46–679.52, 361/688, 690, 693–697, 703, 704
See application file for complete search history.

(56) References Cited

U.S. PATENT DOCUMENTS

| 8,256,495 B2 * | 9/2012 | Hattori et al. ................. 165/11.1 |
| 8,395,889 B2 * | 3/2013 | Hata et al. ................. 361/679.47 |
| 2006/0039113 A1 * | 2/2006 | Cheng et al. ................. 361/700 |

FOREIGN PATENT DOCUMENTS

JP        2009-163623 A        7/2009

* cited by examiner

*Primary Examiner* — Robert J Hoffberg
*Assistant Examiner* — Michael Matey
(74) *Attorney, Agent, or Firm* — Judge Patent Associates

(57) ABSTRACT

An electronic device includes: a casing in which electronic components including a heat-emitting component which emits heat during operation are accommodated; a heat-dissipating component including a plurality of fins to which heat emitted in the heat-emitting component transfers; a fan operable to supply cooling air to the heat-dissipating component; and a cleaning component movable on an end surface of the fins along the side nearer the fan with the cleaning component abutting against the end surface of the fins. In these features, dust on the end surface of the fins can be automatically removed by moving the cleaning component in the case of the spatial orientation of the electronic device being changed. Therefore, an effect of removing heat emitted in the heat-emitting components, by using cooling air supplied from the fan, can be continuously obtained.

4 Claims, 11 Drawing Sheets (a) PRIOR ART (b)

ELECTRONIC DEVICE

BACKGROUND

1. Field

The present disclosure relates to electronic devices—e.g., notebook computers and like electronic devices furnished with CPUs (central processing units)—having encased heat-emitting components that emit heat during operation, and in particular relates to the structure of heat-dissipating units that exteriorly release heat from heat-emitting components.

2. Description of the Related Art

Improving the performance of, for example, notebook computers—which are one instance of electronic devices—entails increase in the amount of heat emitted from the heat-emitting components such as the CPU. Further, a notebook computer is a portable electronic device, and to reduce its size and weight as a portable electronic device, the various electronic components are packed into the narrow inside of its casing. Therefore, the provision of heat-dissipating units that offer high performance by effectively releasing to the casing exterior the heat emitted from the heat-emitting components is being called for.

In order to respond to such needs, in an electronic device, a heat-dissipating unit is used which includes: a heat-dissipating component having heat-dissipating fins to which heat transfers from the heat-emitting components; and a fan acting as an air blower for supplying cooling air to the heat-dissipating component. In a conventional heat-dissipating unit of this sort, the CPU as a heat-emitting component is caused to contact directly with the heat-dissipating component, or contact indirectly with the heat-dissipating component via a heat pipe or the like, in order to transfer the heat emitted from the CPU to the heat-dissipating component, so that the heat transferred from the heat-emitting component is released to the casing exterior by the cooling air supplied from the fan. In a conventional heat-dissipating unit of this sort, it is effective to increase the surface area of the fins in order to enhance the heat-dissipating effect, and a plurality of fins are formed and disposed parallel to each other, in a narrow, limited space at short intervals. However, when the intervals at which the fins disposed parallel to each other are formed are short, fine dust contained in the cooling air supplied from the fan is likely to adhere to, for example, the end surfaces of the fins along the side nearer the fan. Once dust adheres to the fin end surfaces, dust is likely to accumulate rapidly. Gaps among the fins tend to become filled with the accumulated dust, and the accumulated dust tends to cover the entire surface of the heat-dissipating component on the side where the cooling air supplied from the fan flows into the heat-dissipating component. When dust accumulates, the fan cannot supply cooling air into the gaps among the fins, and consequently the cooling effect of the heat-dissipating unit deteriorates significantly.

In order to prevent the above-described adhesion of dust to fin end surfaces from deteriorating the cooling effect of a heat-dissipating unit, Japanese Laid-Open Patent Publication No. 2009-163623 suggests a heat-dissipating unit that includes a cleaning component for removing dust adhering to fin end surfaces along the side nearer the fan.

FIG. 10 illustrates an outline of the structure of a conventional heat-dissipating unit for use in electronic devices as described in Japanese Laid-Open Patent Publication No. 2009-163623.

The conventional heat-dissipating unit 100 includes a fan 101 for supplying cooling air, and a heat-dissipating component (heat sink) 104 having fins 104b. Cooling air supplied from the fan 101 is released through gaps among the fins 104b to the exterior of a casing 105, thereby releasing, to the exterior of the casing 105, heat that is generated in a CPU (not shown) that is a heat-emitting component, and which is transferred to the heat-dissipating component 104.

A workable component 102 of a cleaning member for scraping off dust adhering to the end surfaces of the fins 104 along the side nearer the fan 101, and a moving mechanism 103 for moving the workable component 102, are disposed between the heat-dissipating component 104 and the fan 101.

As shown in FIG. 11, the conventional heat-dissipating unit 100 includes a locking plate 107 for locking a piston 106 connected to the workable component 102. By working the locking plate 107, the workable component 102 cleans the end surfaces of the fins 104b. Specifically, as shown in FIG. 11(a), the workable component 102 is usually fixed, by the locking plate 107, so as to be depressed by the piston 106. As shown in FIG. 11(b), the piston 106 is unlocked by a user working the locking plate 107. When the piston 106 is unlocked, the workable component 102 is shifted upward to the upper-end part of the fins by the urging force of a spring component 108 provided in the moving mechanism 103, with the workable component 102 scrubbing the end surfaces of the fins 104b, thereby removing dust adhering to the end surfaces of the fins 104b. The removed dust is discharged outside the casing 105 by cooling air supplied from the fan 101.

Japanese Laid-Open Patent Publication No. 2009-163623 also discloses a method in which a thermally deformable component is connected to, as a moving mechanism for, the workable component 102, and the thermally deformable component is deformed by heat emitted due to operation of the heat-emitting-component, CPU, to remove dust on the end surfaces of the fins 104b.

In the conventional heat-dissipating unit 100 of the electronic device, the workable component 102 of the cleaning member contacts with the end surfaces of the fins 104b to which dust contained in cooling air supplied from the fan 101 adheres, to allow the dust adhering thereto to be wiped off. The workable component 102 removes a great amount of dust accumulated on the end surfaces of the fins 104b along the side nearer the fan 101. Therefore, flow of cooling air into the heat-dissipating component 104 is not prevented.

However, in the conventional heat-dissipating unit 100, in order to allow the workable component 102 to remove dust, a mechanism for moving the workable component 102 upward and downward along the end surfaces of the fins 104b is to be provided, and the operation for moving the workable component 102 is to be performed by a user. On the other hand, in a case where heat emitted in the heat-emitting components is detected, and cleaning is performed by using the thermally deformable component without causing a user to perform the operation, the workable component 102 cannot be moved for cleaning at a temperature lower than a temperature at which the deformation occurs. Further, due to limitations on the extent to which the thermally deformable component is deformable, the mechanism for moving the workable component 102 is inevitably to be larger-scale.

SUMMARY

An object of the application is to make available an electronic device that is able to automatically, with a simplified structure, remove dust on end surfaces of fins, and continue to effectively remove heat emitted from heat-emitting components, to solve, by these features, the problem with electronic devices having conventional heat-dissipating units as described above.

In order to solve the aforementioned problems, in one general aspect, the electronic device of the techniques disclosed herein includes: a casing in which electronic components including a heat-emitting component that emits heat during operation are accommodated; a heat-dissipating component including a plurality of fins to which heat emitted in the heat-emitting component transfers; a fan operable to supply cooling air to the heat-dissipating component; and a cleaning component, disposed between the heat-dissipating component and the fan, movable under its own weight along an end surface of the fins on the fan side of the fins while abutting against the end surface of the fins.

In the electronic device having the features described above, the cleaning component for removing dust on the end surface of the fins to which heat emitted in the heat-emitting components transfers, moves with the cleaning component abutting against the end surface of the fins along the side nearer the fan, under its own weight. Thus, in a case where the spatial orientation of the electronic device is changed when, for example, the electronic device is carried, the cleaning component moves, so that the cleaning component can remove dust on the end surface of the fins while moving. Therefore, an electronic device can be obtained in which dust on an end surface of fins along the side nearer a fan can be removed with a simplified structure, and a stable heat-dissipating effect can be exerted over a long time period.

In another general aspect, in the electronic device having the features described above, while the heat-emitting component is operating and the fan is supplying cooling air, the cleaning component is accommodated in a retracted position, and the retracted position allows the cleaning component to be retracted from a region in which the cooling air supplied from the fan into the heat-dissipating component flows through the fins. Thus, when heat-emitting components are operating and heat is emitted therein, cooling air supplied from the fan to the heat-dissipating component is not blocked by the cleaning component, and a sufficient heat-dissipating effect of the heat-dissipating unit can be assuredly obtained.

In still another general aspect, the cleaning component includes: a cleaning component body abutting against the end surface of the fins on the fan side of the fins; and guide portions disposed on either of terminal ends of the cleaning component body, in which a surface area of each guide portion, which is orthogonal to the cleaning component lengthwise, is greater than a surface area of the cleaning component body, which is orthogonal to the cleaning component lengthwise. Further, guide grooves are formed for holding the guide portions within the casing, to regulate the cleaning component positionally. Thus, the cleaning component can be prevented from tilting relative to the heat-dissipating component, so that a smooth movement of the cleaning component can be assuredly obtained.

In still another general aspect, the cleaning component has a circular form in cross-section orthogonal to the cleaning component body lengthwise. Thus, movement of the cleaning component in a state where the cleaning component abuts against the end surface of the fins is facilitated, thereby assuredly removing adhered dust.

BRIEF DESCRIPTION OF THE DRAWINGS

FIG. 11(a) illustrates a standard state in which a workable component is positioned at a lower end portion of fins, and FIG. 11(b) illustrates a state in which the workable component has moved to an upper end portion of the fins, and removed the dust.

DETAILED DESCRIPTION

Embodiment

Hereinafter, an exemplary case in which an electronic device is a notebook computer will be described as an exemplary embodiment.

Figure 1:
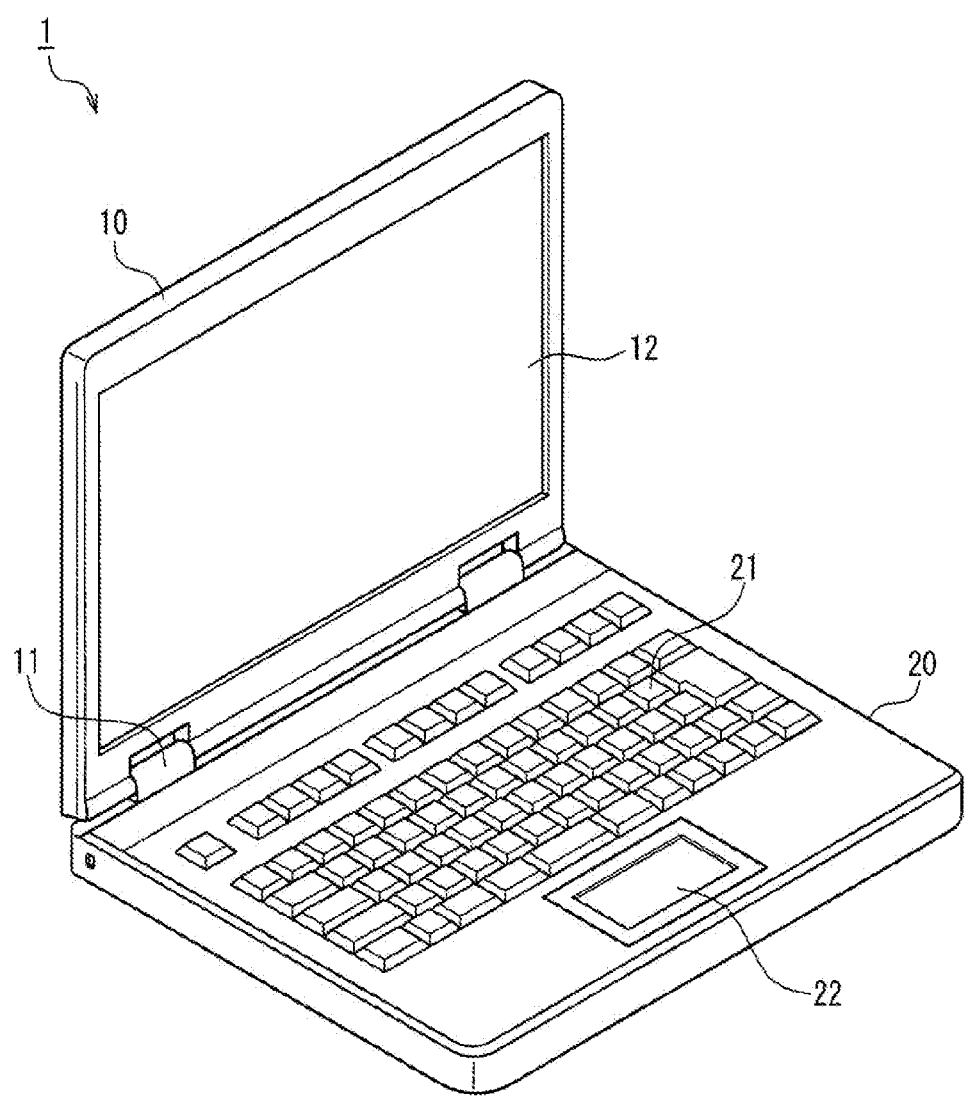
FIG. 1 is a perspective view of an outline of an exemplary structure of a notebook computer according to the present embodiment.

FIG. 1 illustrates a notebook computer 1 as an electronic device according to an exemplary embodiment.

The notebook computer 1 is structured such that a cover component 10 having a display device 12, such as a liquid crystal panel, disposed on an inner side surface thereof is mounted so as to be pivotable relative to a main unit 20 having input devices, such as a keyboard 21 and a pointing device 22, disposed on the surface thereof, by means of a hinge mechanism 11.

Inside the main unit 20, a secondary battery (not shown) for operating the notebook computer 1, a hard disk drive (HDD) (not shown) acting as a main storage device, and other electric components are disposed. The notebook computer 1 can include, for example, an antenna module for wireless LAN communication, a disk drive for blu-ray discs and DVD discs, a web camera device, a sound microphone and loudspeaker, and various other input/output terminals. The functions and shapes thereof are the same as those of conventionally known notebook computers, and illustration and detailed description thereof are not given.

Figure 2:
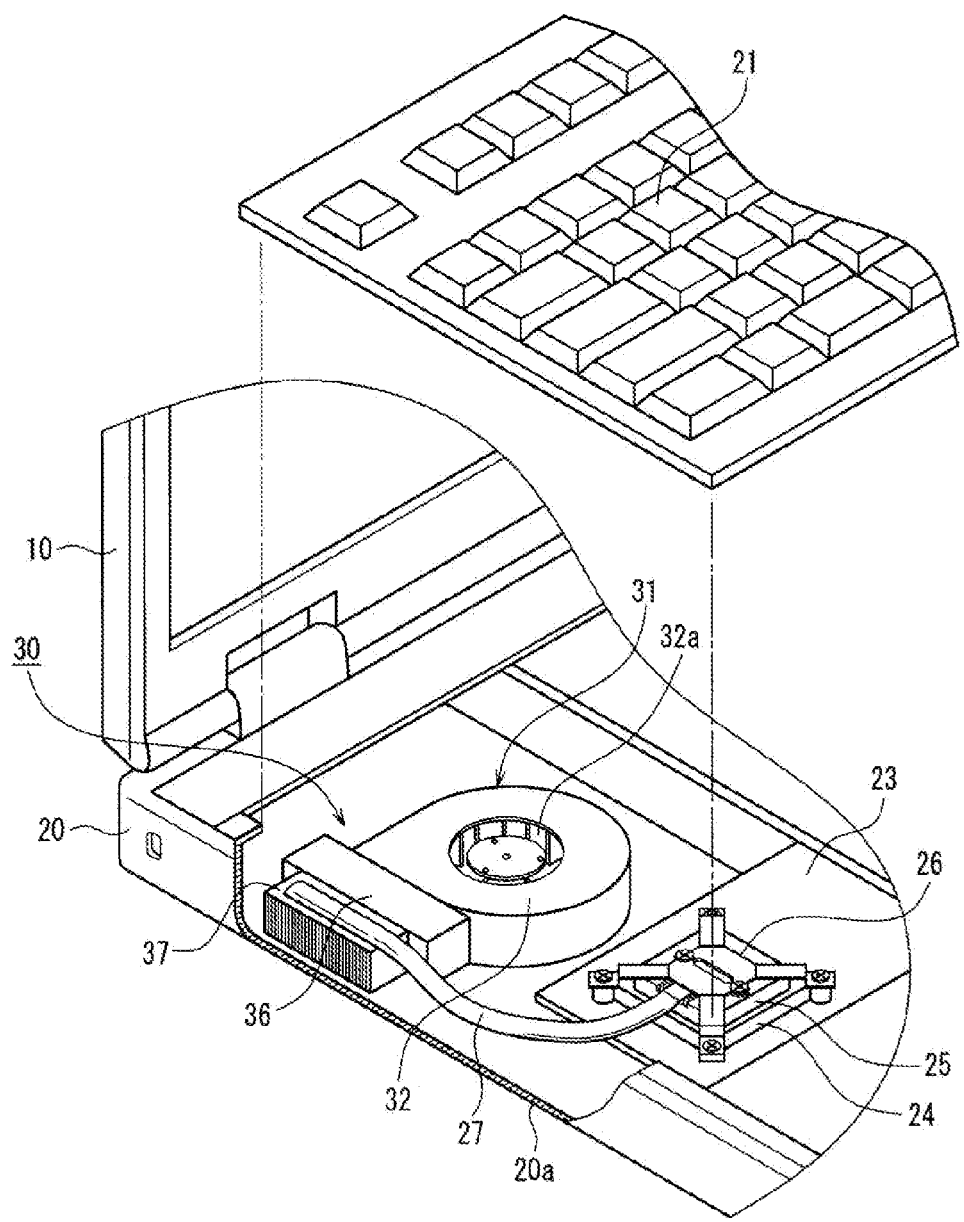
FIG. 2 is an exploded perspective view of main components of a heat-dissipating unit in the notebook computer according to the present embodiment.

FIG. 2 is an exploded perspective view of an internal structure of the main unit 20 of the notebook computer 1. In the present embodiment, heat release of a central processing unit (CPU) 24 which is a typical heat-emitting component having its temperature maximized during operation, among various electronic components disposed in the main unit 20, will be described. FIG. 2 illustrates, in an enlarged manner, the CPU 24 and a vicinity of a heat-dissipating unit 30 for releasing, to the exterior of a casing 20a, heat generated in the CPU 24.

As shown in FIG. 2, the CPU 24 is mounted and disposed on a circuit substrate 23 inside the main unit 20 below the keyboard 21 disposed on the surface of the notebook computer 1. On the top surface of the CPU 24, a heat receiving portion 25 is disposed for transferring, to the heat-dissipating unit 30, heat emitted while the CPU 24 is operating. The heat receiving portion 25 is pressed against and secured to the CPU 24 which is a heat source by means of a securing component 26 having spring-like legs.

The heat receiving portion 25 includes the heat-dissipating unit 30 having a heat-dissipating component 37 for transferring heat received from the CPU 24. A heat pipe 27 made of, for example, copper is connected to the heat-dissipating unit 30. Inside the heat pipe 27, for example, a heat conductive medium, such as an alternative for chlorofluorocarbon, having a high heat conductivity is sealed to efficiently transfer, to the heat-dissipating component 37, heat transferred from the CPU 24 to the heat receiving portion 25.

In the notebook computer 1, the heat-dissipating unit 30 for effectively releasing heat emitted in the CPU 24 to the exterior of the casing 20a of the main unit 20 is thermally connected. The heat-dissipating unit 30 includes a cleaning component (described below) disposed in guide grooves 36, in addition to the heat-dissipating component 37 and a fan 31 (FIG. 2 shows an outer appearance thereof, and the guide grooves 36 are formed in the inside portion). The fan 31 draws in ambient air from an air inlet 32a formed in the top surface of a fan case 32, and supplies the air as cooling air to the heat-dissipating component 37, to release the air to the exterior of the casing 20a, so that an effect of releasing heat from the heat-dissipating component 37 to the exterior of the casing 20a is enhanced.

Figure 3:
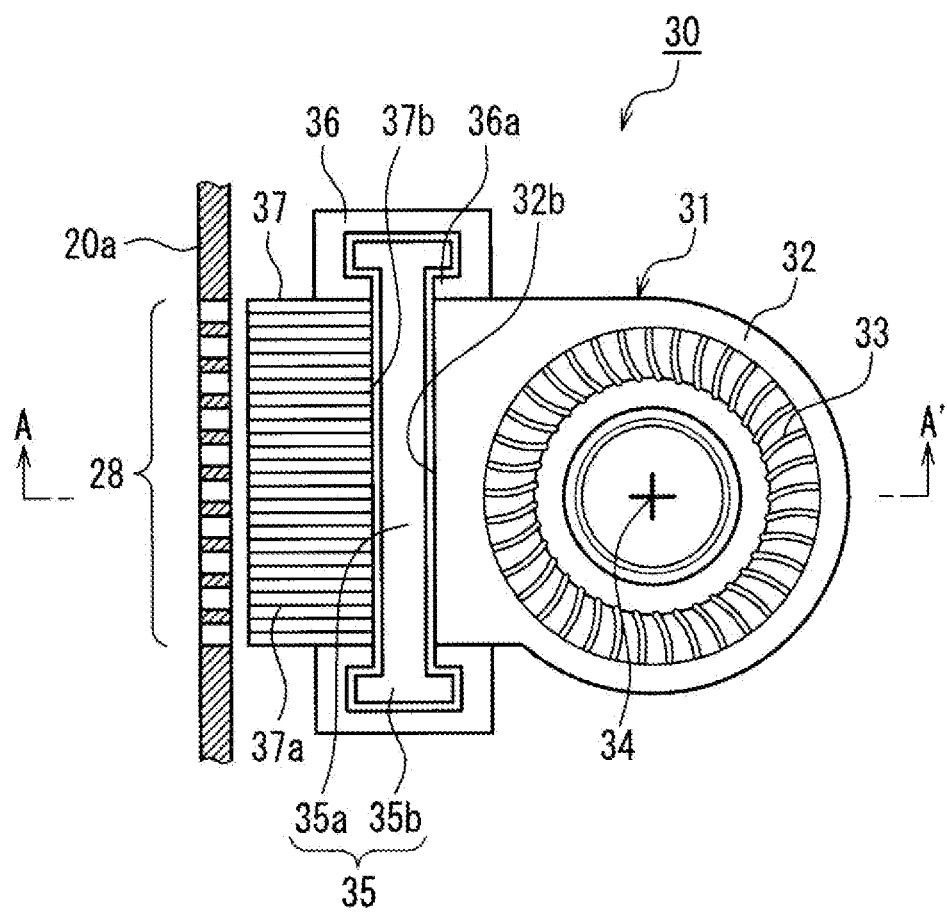
FIG. 3 is a horizontal cross-sectional view illustrating a structure of the heat-dissipating unit of the notebook computer according to the present embodiment.

FIG. 3 illustrates a structure of the heat-dissipating unit 30 of the notebook computer 1.

FIG. 3 illustrates in detail structures of components of the heat-dissipating unit 30, that is, structures of the fan 31, a cleaning component 35, the guide grooves 36 for regulating the cleaning component 35 positionally, and the heat-dissipating component 37. FIG. 3 is a horizontal cross-sectional view illustrating a state in which each component is cut on the horizontal plane parallel to a main surface, of the main unit 20 of the notebook computer 1, on which the keyboard 21 is disposed. FIG. 3 shows an arrangement of these components.

In the fan 31, blades 33 accommodated in the fan case 32 rotate about a rotation shaft 34 corresponding to the rotation axis. When the blades 33 rotate, the fan 31 draws in ambient air through the air inlet 32a which is formed on the top surface of the fan case 32 as shown in FIG. 2, and allows the air to flow as cooling air through an air outlet 32b formed along the side nearer the heat-dissipating component 37. A sirocco fan in which the blades 33 are formed as multiple forward blades as shown in FIG. 3 is described as the fan 31 of the present embodiment. However, the shape of the entirety of the fan 31, the shape of the air inlet 32a, the shapes of the blades 33 which rotate about the rotation shaft 34, and the like are exemplary ones. Therefore, the fan 31 is not limited to a sirocco fan, and may be any of various types of cooling fans (heat-dissipating fans) which can draw in ambient air through an air inlet, and allows the air to be discharged through an air outlet, as conventionally used.

A structure in which a heat-dissipating component is disposed in close contact with an air outlet formed in a fan case of a fan, is typically used. However, in the heat-dissipating unit 30 of the present embodiment, the cleaning component 35 is disposed between the air outlet 32b of the fan 31, and the heat-dissipating component 37.

In the heat-dissipating unit 30, the cleaning component 35 abuts against an end surface 37b of the heat-dissipating component 37 along the side nearer the fan 31, and a cleaning component body 35a for removing dust on the end surface 37b has a cylindrical shape in which a cross-section orthogonal to the length direction is circular. Further, guide portions 35b each having a disk-like shape are formed on both terminal ends, in the length direction, of the cleaning component body 35a having the cylindrical shape. Each guide portion 35b having the disk-like shape has a diameter which is greater than that of the cleaning component body 35a, so as to regulate the cleaning component 35 positionally. Therefore, the cleaning component 35 is shaped like an upper-case "I" in a planar view through the side of the keyboard 21 disposed in the face of the main unit 20 of the notebook computer 1.

The guide grooves 36 are formed so as to enclose the cleaning component 35 disposed between the fan 31 and the heat-dissipating component 37 such that the cleaning component 35 is able to smoothly move under its own weight with the cleaning component 35 abutting against the end surface of the heat-dissipating component 37. The guide grooves 36 sandwich the cleaning component 35 from both outer ends of the cleaning component 35 lengthwise, by enclosing the guide portions 35b of the cleaning component 35, thereby regulating the cleaning component 35 positionally. Further, the guide grooves 36 have projections 36a formed for regulating the guide portions 35b of the cleaning component 35 positionally, and the projections 36a are opposed to the heat-dissipating component 37 and the fan 31, respectively, so as to sandwich the cleaning component body 35a.

In the notebook computer 1, the cleaning component 35 and the guide grooves 36 are structured as, for example, a component formed of a synthetic resin such as a polyacetal-based resin or a fluorine-containing resin which can offer a high slidability. Thus, when the cleaning component 35 is moved to remove dust on the heat-dissipating component 37, production of an unintended loud sound can be prevented. Further, as described below in detail, the cleaning component 35 moves under its own weight when the spatial orientation of the notebook computer 1 is changed, thereby removing dust on the end surface 37b of fins 37a along the side nearer the fan 31. Therefore, the cleaning component 35 can be formed of a metal such as a stainless steel which allows the cleaning component 35 to assuredly have a weight sufficient for the movement. Further, the guide grooves 36 can be formed of a metal so as to assuredly have a predetermined strength, and prevent deformation. Further, the cleaning component 35 and the guide grooves 36 may be each formed of a composite material such that the insides thereof are formed of a metal, and the surfaces thereof may be coated with the resin described above. In this case, each of the cleaning component 35 and the guide grooves 36 can assuredly have a predetermined weight and strength, and are simultaneously allowed to smoothly slide and have favorable quietness.

The heat-dissipating component 37 is made of a metal such as copper having a high heat conductivity. In the heat-dissipating component 37, the fins 37a formed as a plurality of thin-plate-like components extend from the fan 31 toward the exterior of the casing 20a so as to be parallel to a direction in which the cooling air flows. The dimensions of the heat-dissipating component 37, in particular, a width and a height of the outer shape as viewed from the fan 31 side are the same as those of the outer shape of the air outlet 32b of the fan 31. Further, the heat-dissipating unit 30 of the present embodiment is structured such that the guide grooves 36 for regulating the cleaning component 35 positionally are positioned between the fan 31 and the heat-dissipating component 37 without forming a gap therebetween. Therefore, the cooling air discharged through the air outlet 32b of the fan 31 is directly introduced into spaces among the fins 37a of the heat-dissipating component 37. Namely, the heat-dissipating unit 30 of the present embodiment can assuredly offer the same heat-dissipating efficiency as conventional heat-dissipating units in which the cleaning component 35 is not disposed between the fan 31 and the heat-dissipating component 37.

When the cooling air which has been supplied from the fan 31 and has passed through the gaps among the fins 37a is discharged outside the main unit 20 through a discharge outlet 28 which is formed as, for example, slits or through holes in the casing 20a so as to correspond to the outer shape of the heat-dissipating component 37.

Figure 4:
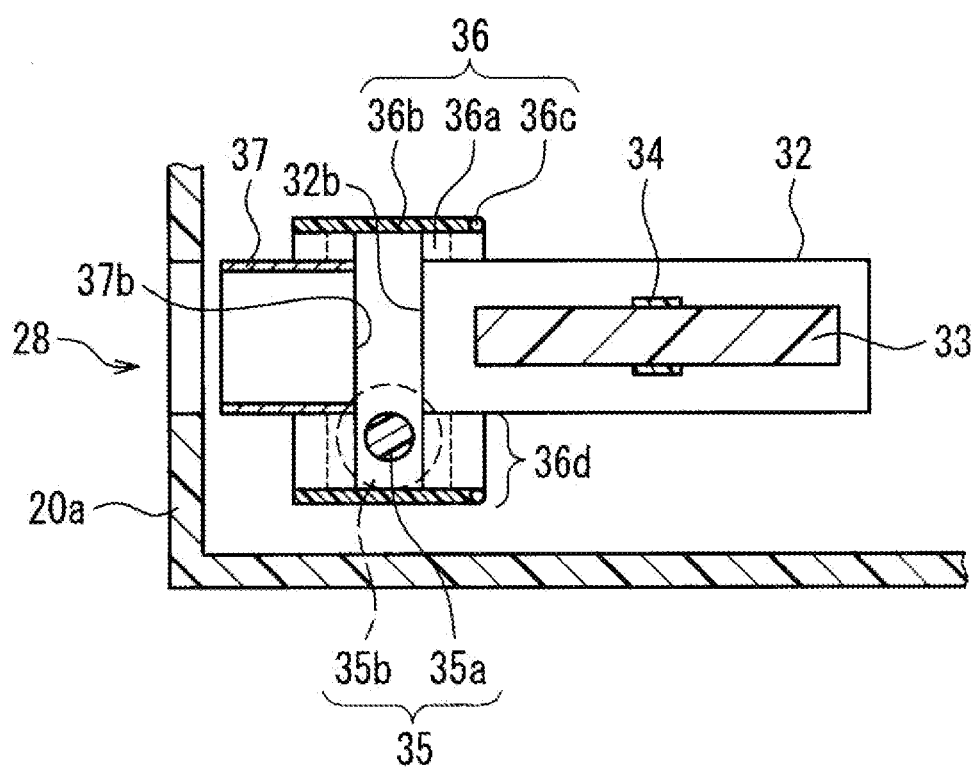
FIG. 4 is a vertical cross-sectional view illustrating the structure of the heat-dissipating unit of the notebook computer according to the present embodiment.

FIG. 4 is a vertical cross-sectional view illustrating a structure of the heat-dissipating unit 30 of the notebook computer 1 as shown in FIG. 3. Namely, FIG. 4 shows the cross-sectional shape orthogonal to a side surface 20a of the casing 20, and obtained in a slice through the rotation shaft 34 of the fan 31. FIG. 4 shows a form taken along the line A-A', in the direction of the arrows in FIG. 3.

According to the present embodiment, as shown in FIG. 4, a retracted position 36d is formed below the bottom surfaces of the fan 31 and the heat-dissipating component 37. The cleaning component 35 disposed between the fan 31 and the heat-dissipating component 37 is accommodated in the retracted position 36d of the guide grooves 36 when the cleaning component 35 is in a stationary state. Thus, the retracted position 36d into which the cleaning component 35 is retracted is formed on a side nearer the bottom of the fins 37a. In this case, the side nearer the bottom of the fins 37a is a side nearer a bottom which is formed in a state where the notebook computer 1 is used, namely, in a state where the main unit of the notebook computer 1 is disposed on an almost horizontal plane of a desk or the like. Consequently, when, for example, the notebook computer 1 is used, the cleaning component 35 can be retracted, under its own weight, into a position at which cooling air supplied from the fan 31 to the heat-dissipating component 37 is not blocked. Namely, the cleaning component 35 is retracted into the retracted position 36d from a region in which cooling air flows through the heat-dissipating component 37, thereby efficiently cooling the heat-dissipating component 37 with the cooling air. Therefore, in a state where the notebook computer 1 is powered on, the CPU 24 (see FIG. 2) operates, and the fan 31 operates to supply cooling air, the cooling air supplied from the fan 31 is not blocked by the cleaning component 35, thereby preventing reduction of heat-dissipating efficiency.

Figure 11:
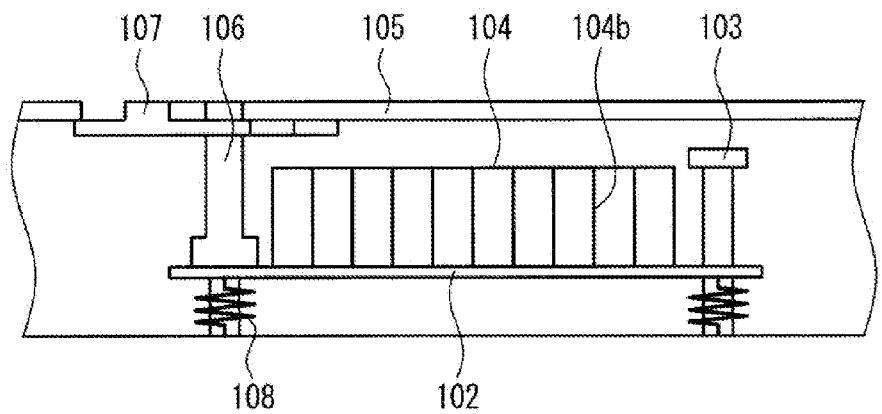
FIG. 11 illustrates an operation of removing dust by the conventional heat-dissipating unit.
Figure 11:
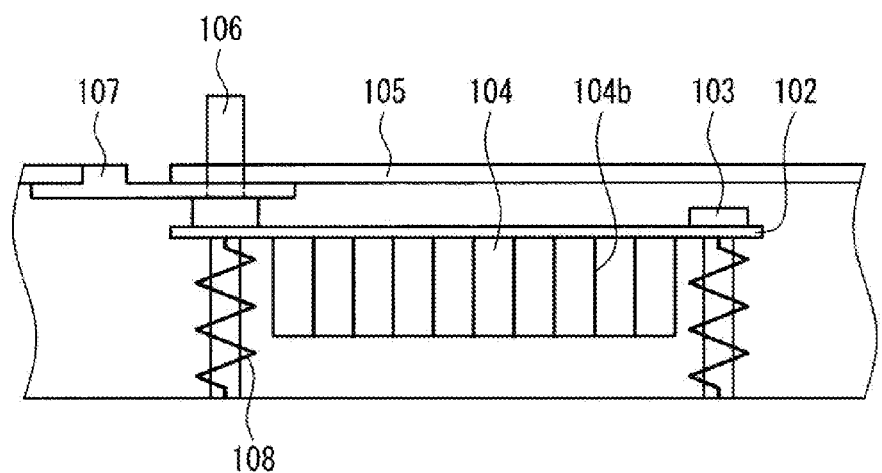

Further, since the cleaning component 35 is retracted into the retracted position 36d while the fan 31 is operating, the cleaning component 35 may not be formed as a plate-like component the thickness of which is variable for alleviating blocking of cooling air by the workable component 102 as in the conventional art shown in FIG. 11. The cleaning component 35 may have a thin-plate-like shape, so that the cleaning component 35 is less likely to be deformed. When the heat-dissipating unit 30 is thus structured, a fundamental function of the cleaning component 35 for removing dust on the end surface 37b of the fins 37a along the side nearer the fan 31, can be realized.

The heat-dissipating unit 30 of the present embodiment has a structure in which the retracted position 36d is formed so as to be located in a lower portion of the guide grooves 36 when the notebook computer is normally used. In such a structure, when the notebook computer 1 is normally used, the cleaning component 35 is allowed to retract into the retracted position 36d under its own weight. However, the structure in which the cleaning component 35 is retracted from a flow path of cooling air is not limited to the structure shown in FIG. 4. Namely, the retracted position 36d may not be formed so as to be located in a lower portion of the guide grooves 36, and may be formed so as to be located in any portion, such as an upper portion of the guide grooves 36 or a portion lateral to the guide grooves 36, into which the cleaning component 35 can be retracted from a position between the fan 31 and the heat-dissipating component 37. Further, when a user moves the notebook computer 1 in a state where the notebook computer 1 is operating, a state in which the cleaning component 35 moves and blocks cooling air supplied from the fan 31 may not be completely avoided even when the retracted position 36d is formed so as to be located in the lower portion of the guide grooves 36 as shown in FIG. 4. Therefore, for example, a stop may be provided for preventing the cleaning component 35 from moving from the retracted position 36d in a case of an operation of the CPU 24 or an operation of the fan 31 being detected in the notebook computer 1.

Further, as shown in FIG. 4, the guide grooves 36 of the heat-dissipating unit 30 according to the present embodiment have cover portions 36b pivotable about shafts 36c, on end portions in the upward and downward directions, respectively, in the drawings. By opening or closing each cover portion 36b, dust removed from the end surface of the heat-dissipating component 37 by the cleaning component 35 can be released to the exterior of the guide grooves 36.

An operation of the cleaning component 35 moving with the cleaning component 35 abutting against the end surface of the heat-dissipating component 37 will be described with reference to FIG. 5.

Figure 5:
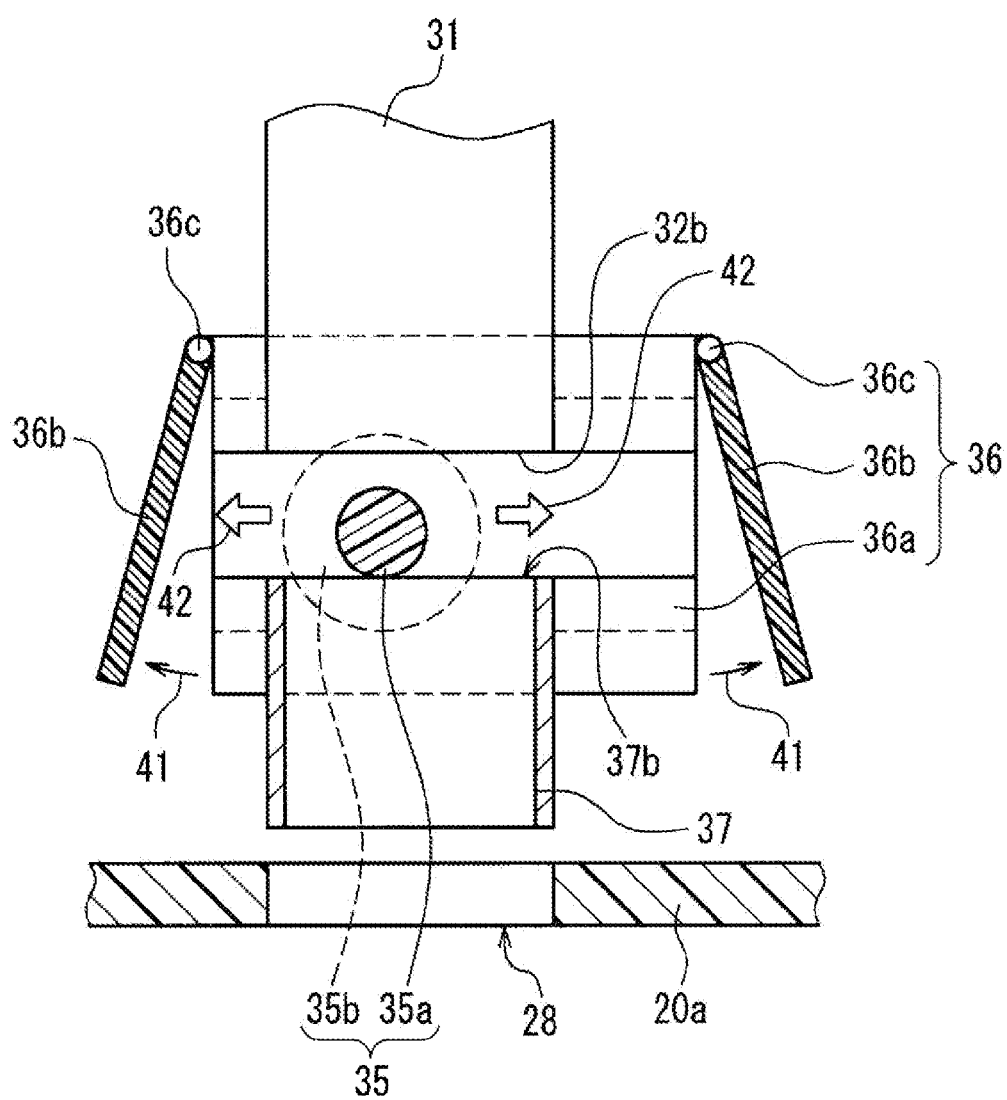
FIG. 5 illustrates a state in which a cleaning component in the heat-dissipating unit of the notebook computer operates according to the present embodiment.

FIG. 5 is an enlarged cross-sectional view of a portion in which the cleaning component 35 is disposed between the fan 31 and the heat-dissipating component 37. When the discharge outlet 28 formed in the casing 20a on the side surface of the main unit 20 is located so as to face in the vertically downward direction while, for example, a user is carrying the notebook computer 1, the cleaning component 35 rolls on the end surface 37b of the fins 37a of the heat-dissipating component 37 along the side nearer the fan 31, under its own weight, to remove adhered dust. Therefore, FIG. 5 shows the discharge outlet 28 formed in the casing 20a, on the lower side in FIG. 5.

In the state shown in FIG. 5, the cleaning component body 35a abuts against surfaces (on the end surface 37b in FIG. 5) of the projections 36a of the guide grooves 36 formed along the side nearer the heat-dissipating component 37, under its own weight. Further, the cleaning component body 35a has a cylindrical shape in which the cross section in the direction orthogonal to the length direction is circular. Therefore, when the notebook computer 1 is tilted or vibration is conveyed to the notebook computer 1, the cleaning component body 35a is allowed to move in the leftward and rightward direction in FIG. 5, that is, in the directions indicated by hollow arrows 42 in FIG. 5 with the cleaning component body 35a abutting against the end surface 37b of the fins 37a along the side nearer the fan 31. Thus, the cleaning component 35 is allowed to move with the cleaning component 35 abutting against the end surface 37b of the fins 37a along the side nearer the fan 31, under its own weight, without additionally providing a mechanism for operating the cleaning component 35, thereby scraping dust on the end surface 37b.

Figure 6:
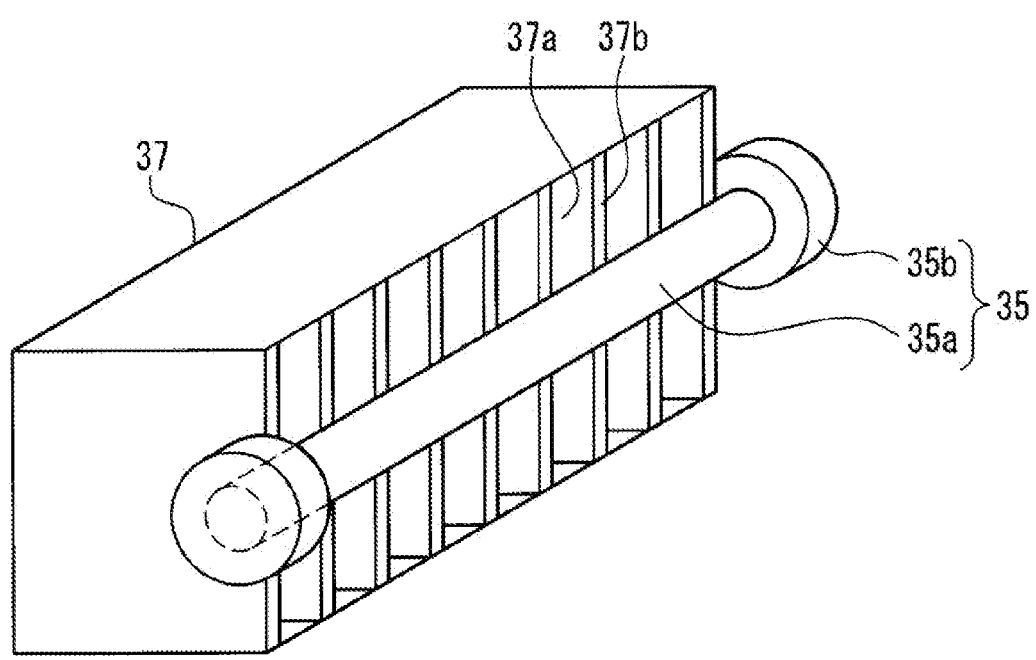
FIG. 6 is a perspective view illustrating a state in which dust on an end surface of fins are removed by the cleaning component in the heat-dissipating unit of the notebook computer according to the present embodiment.

Namely, as shown in the perspective view of FIG. 6, in a state where the cleaning component 35 abuts against the end surface 37b of the heat-dissipating component 37 along the side nearer the fan 31, the cleaning component body 35a which is regulated positionally by the guide portions 35b of the cleaning component 35 moves on the end surface 37b of the fins 37a along the side nearer the fan 31 with the cleaning component body 35a abutting against the end surface 37b. In this manner, dust on the end surface 37b of the fins 37a along the side nearer the fan 31 is scraped away.

The dust having been scraped off the end surface 37b by the cleaning component 35 is discharged through gaps among the fins 37a in the heat-dissipating component 37 from the heat-dissipating component 37. At this time, since the notebook computer 1 is positioned such that the discharge outlet 28 formed in the casing 20a faces in the vertically downward direction, the dust having been scraped off the end surface 37b by the cleaning component 35 is expected to be directly discharged through the discharge outlet 28 to the exterior of the casing 20a.

On the other hand, also in a case where the dust having been scraped off the end surface 37b of the fins 37a is not completely discharged from the heat-dissipating component 37, for example, the next time the notebook computer 1 is operated, and cooling air supplied from the fan 31 flows into the heat-dissipating component 37, the dust left undischarged can be discharged outside the heat-dissipating component 37, and further discharged through the discharge outlet 28 to the exterior of the casing 20a.

Further, in the heat-dissipating unit 30 of the present embodiment, as shown in FIG. 5, when the cleaning component 35 moves with the cleaning component 35 abutting against the end surface 37b of the fins 37a along the side nearer the fan 31, and scrapes adhered dust away, the cover portions 36b formed on both end portions, in the leftward and rightward directions in FIG. 5, that is, in the thickness direction of the main unit 20 of the notebook computer 1, pivot about the shafts 36c to open in the directions indicated by arrows 41 in FIG. 5. Therefore, the dust having been scraped off the end surface 37b of the fins 37a along the side nearer the fan 31 can be discharged into the casing 20a from a space in the guide grooves 36 instead of discharging the dust through the heat-dissipating component 37.

When an angle by which each cover portion 36b opens is excessively great, the cleaning component 35 moving under its own weight may fall from the guide grooves 36 to the exterior. The dust on the heat-dissipating component 37 is fine dust. Therefore, a gap formed by pivoting of each cover portion 36b may not be great. Therefore, needless to say, the angle by which each cover portion 36b opens is set so as to prevent the cleaning component 35 from falling from the guide grooves 36 to the exterior.

The shape of each cover portion 36b formed on the guide grooves 36 is not limited to a shape that allows the entirety of each end surface (each end surface in the leftward and rightward directions in FIG. 5) of the guide grooves 36 in the upward and downward directions to open by pivoting of the cover portions 36b, as shown in FIG. 5. For example, a cover portion may be structured such that about a half portion of each guide groove 36 along the side nearer the heat-dissipating component 37, opens by rotating or sliding of the cover portion, to discharge the dust having been scraped by the cleaning component 35, outside the guide grooves 36.

The dust having been discharged outside guide grooves 36 through the cover portions 36b of the guide grooves 36 is not immediately discharged to the exterior of the casing 20a as it is. Therefore, at least a portion of the dust having been scraped may be drawn in again through the air inlet of the fan 31, and enter the heat-dissipating component 37. However, also in this case, the dust is less likely to adhere again to the end surface 37b of the fins 37a along the side nearer the fan 31. The dust is likely to be rather discharged outside the casing 20a by cooling air. If the dust adheres again to the end surface 37b of the fins 37a along the side nearer the fan 31, the dust is removed by the cleaning component 35. Thus, if the dust having been scraped, by the cleaning component 35, off the end surface 37b of the fins 37a along the side nearer the fan 31 is discharged into the casing 20a through the cover portions 36b of the guide grooves 36, this is not a significant problem as compared to a problem that dust that adheres to or accumulates on the end surface 37b of the fins 37a causes reduction of heat-dissipating efficiency.

As described above, the notebook computer 1 of the present embodiment is structured such that the cleaning component 35 which moves under its own weight in the case of the spatial orientation of the notebook computer 1 being changed, to scrape dust on the end surface 37b of the fins 37a of the heat-dissipating component 37 along the side nearer the fan 31, is disposed between the fan 31 and the heat-dissipating component 37 of the heat-dissipating unit 30. Therefore, in the notebook computer 1, debris due to dust mixed in the cooling air from the fan 31 clinging to the end surface of the fins 37a can be removed, with a simplified structure, without requiring a specific mechanism for operating the cleaning component 35. The removal of dust can be performed by an ordinary operation of a user carrying the notebook computer 1, or changing a position in which the notebook computer 1 is disposed. Therefore, dust is prevented from accumulating on the entire surface on which cooling air flows into the fins of the heat-dissipating component 37, so that reduction of heat-dissipating efficiency can be avoided.

Further, the heat-dissipating unit 30 of the present embodiment is structured such that the cleaning component 35 is accommodated in the retracted position 36d in the guide grooves 36 when the notebook computer 1 is used and the fan 31 for releasing heat generated in the CPU 24 is operating. As a result, a state in which, in the heat heat-dissipating unit 30, cooling air supplied from the fan 31 hits the cleaning component 35, and the cleaning component 35 blocks the cooling air to be supplied to the heat-dissipating component 37, which causes reduction of heat-dissipating efficiency, can be avoided. Therefore, the notebook computer 1 that can prevent reduction of heat-dissipating efficiency even when operated for a long time period, can be obtained.

The cleaning component 35 according to the present embodiment is structured such that the cleaning component 35 has the guide portions 35b each having an increased cross-sectional area, and the guide portions 35b are formed on both terminal ends of the cleaning component body 35a which abuts against the end surface 37b of the fins 37a, so as to allow the cleaning component body 35a to move with the cleaning component body 35a abutting against the end surface 37b of the fins 37a along the side nearer the fan 31, and the guide grooves 36 for regulating the guide portions 35b positionally are formed on both end sides of a portion between the fan 31 and the heat-dissipating component 37. However, the notebook computer 1 of the present embodiment may not include the guide portions 35b of the cleaning component 35, and the guide grooves 36. The cleaning component 35 may have any structure in which the cleaning component 35 is allowed to remove adhered dust with the cleaning component 35 abutting against the end surface 37b of the fins 37a along the side nearer the fan 31, under its own weight, when, for example, the notebook computer 1 is tilted.

Figure 7:
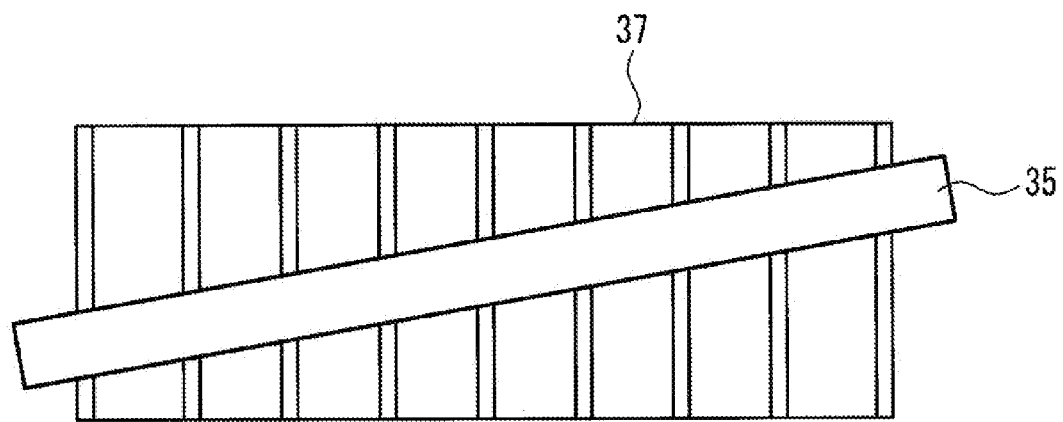
FIG. 7 illustrates a state in which the cleaning component is tilted.

The cleaning component 35 is structured to move with the cleaning component 35 abutting against the heat-dissipating component 37 under its own weight. Therefore, for example, if the cleaning component 35 tilts diagonally along the surface of the heat-dissipating component 37 that is opposed to the fan 31, as shown in FIG. 7, dust may not be smoothly removed. Further, when the cleaning component 35 is excessively tilted, the cleaning component 35 may be caught on the surface of the heat-dissipating component 37 on a side opposing the fan, so that the cleaning component 35 may not be moved into the retracted position 35d when the fan 31 operates. In this case, the cleaning component 35 blocks cooling air, and the heat-dissipating effect may be reduced. Therefore, the state shown in FIG. 7 is to be avoided.

Figure 8:
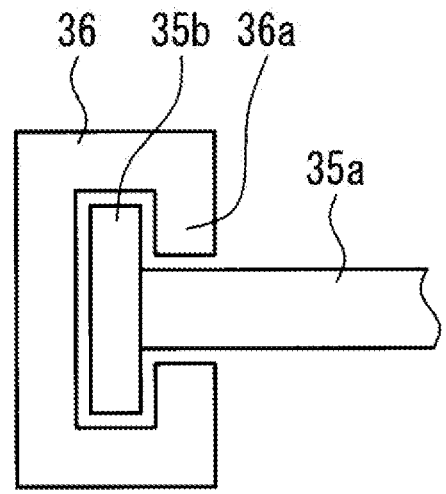
FIG. 8 illustrates a state in which the cleaning component is regulated positionally by guide grooves.

On the other hand, as described herein, in the heat-dissipating unit 30 of the notebook computer 1, as shown in FIG. 8, the guide grooves 36 have the projections 36a for regulating the guide portions 35b of the cleaning component 35 with respect to the cleaning component body 35a, so that a state in which the cleaning component 35 tilts diagonally along the surface of the heat-dissipating component 37 of the heat-dissipating unit 30 on the side opposing the fan 31, can be assuredly avoided.

In the description herein, in the cleaning component 35 of the present embodiment, the cleaning component body 35a which abuts against the end surface of fins 37 along the side nearer the fan 31 has a cylindrical shape. In the cleaning component 35 for use in the heat-dissipating unit 30, a portion which abuts against the end surface 37b of the fins 37 may not be of a cylindrical shape.

Figure 9:
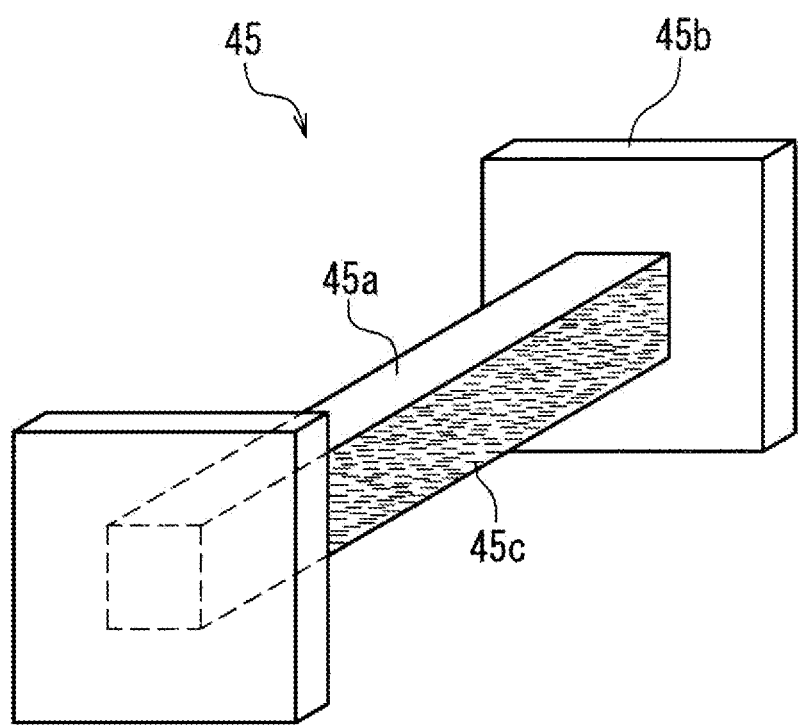
FIG. 9 illustrates another embodiment of the cleaning component in the heat-dissipating unit of the notebook computer according to the present embodiment.
Figure 10:
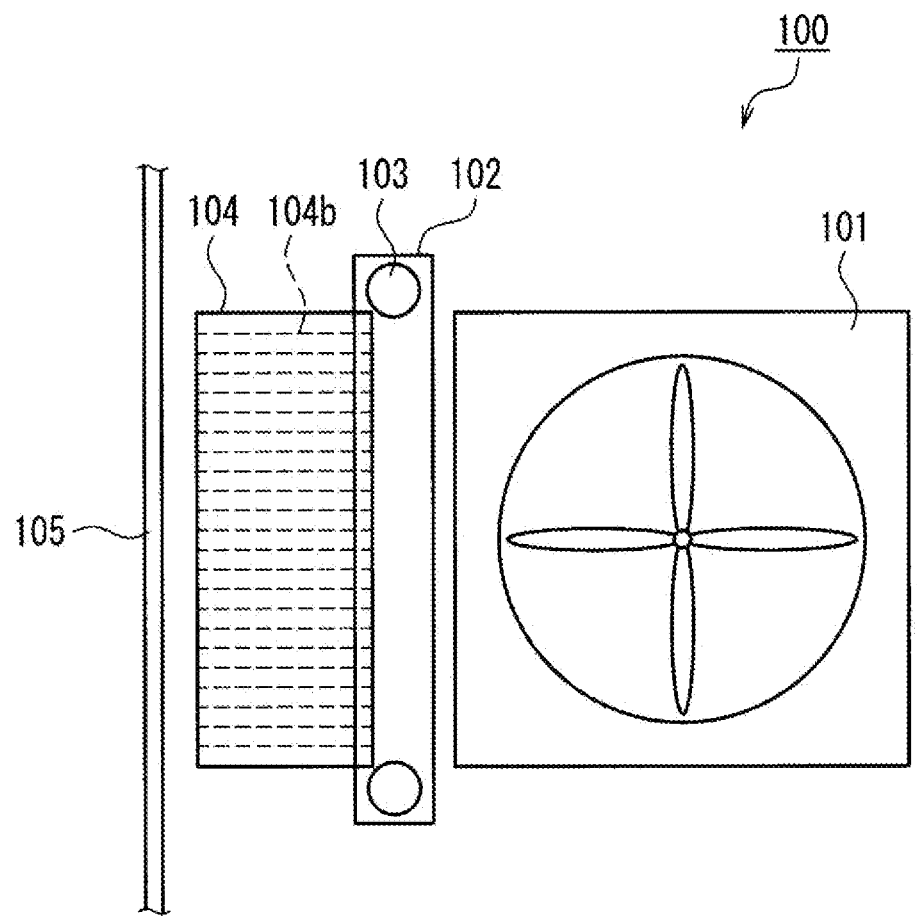
FIG. 10 illustrates a structure of a conventional heat-dissipating unit.

For example, as shown in FIG. 9, a cleaning component 45 having a cleaning component body 45a which has a prismatic shape may be used. In this case, the cleaning component 45 does not easily roll on the end surface 37b of the fins 37, and dust on the end surface 37b of the fins 37 may be scraped while the cleaning component body 45a slides with a predetermined surface of the prismatic shape abutting against the end surface 37b of the fins 37 along the side nearer the fan 31.

When the cleaning component body 45a of the cleaning component 45 has a prismatic shape, guide portions 45b which are formed on both terminal ends of the cleaning component body 45a, and accommodated in guide grooves, are favorably rectangular-plate-shaped, as shown in FIG. 9. The cleaning component body 45a of the cleaning component 45 may have brush-like bristles 45c, on the surface that abuts against the fins 37, as shown in FIG. 9. However, since dust on the end surface 37b of the fins 37 may be, for example, fibrous fine dust, the bristles 45c advantageously may not be, as with a brush for combing animals' fur, made of a synthetic resin, be soft and pliant, and may not adsorb dust. Further, if hair-like material made of metal is used for the bristles 45c, and the hair-like material is formed too densely, dust will be adsorbed among the hairs, with a high likelihood that the dust will build up in the cleaning component 45. In furnishing the bristles 45c, the material, length, and density of the hairs, and directionality of the bristles are to be taken into sufficient consideration so as to prevent dust from adhering to the bristles 45c.

The hair may be formed on the cleaning component 35 in which the cleaning component body 35a has a cylindrical shape as shown in, for example, FIG. 3. In this case, since the entire surface of the cleaning component body 35a abuts against the end surface 37b of the fins 37, the hair is formed on the entire surface of the cleaning component body 35a having the cylindrical shape.

As described above, the notebook computer in which the main unit 20 and the cover component 10 having the display device 12 disposed therein are pivotably secured to each other by means of the hinge mechanism 11 is described as the electronic device according to the present embodiment. The electronic device according to the present embodiment is not limited to such a notebook computer. Various electronic devices having heat-emitting components disposed therein, such as tablet-type personal computers, mobile telephones, hand-held game devices, downsized television receivers, blu-ray displayers, and navigation systems, are considered as the electronic device.

Further, according to the present embodiment, the CPU is described as an exemplary heat-emitting component which emits heat during operation. The heat-emitting component is not limited to a CPU. Various heat-emitting components, such as semiconductor chips in video boards and the like for image processing, and secondary batteries, which emit heat to be released to the exterior of the casings, are considered as the heat-emitting component.

Further, according to the present embodiment, a heat pipe is used as a component for transferring heat from the CPU to the heat-dissipating component. However, the heat-dissipating component may be secured directly to the CPU which is one of the heat-emitting components, by means of a thermally conductive adhesive, to transfer heat from the heat-emitting components directly to the heat-dissipating component.

What is claimed is:

1. An electronic device comprising:
    a casing in which electronic components including a heat-emitting component that emits heat during operation are accommodated;
    a heat-dissipating component including a plurality of fins to which heat emitted in the heat-emitting component transfers;
    a fan operable to supply cooling air to the heat-dissipating component; and
    a cleaning component, disposed between the heat-dissipating component and the fan, movable under its own weight along an end surface of the fins on the fan side of the fins while abutting against the end surface of the fins.

2. The electronic device according to claim 1, wherein, while the heat-emitting component is operating and the fan is supplying cooling air, the cleaning component is accommodated in a retracted position, and the retracted position allows the cleaning component to be retracted from a region in which the cooling air supplied from the fan into the heat-dissipating component flows through the fins.

3. The electronic device according to claim 1, the cleaning component including:
    a cleaning component body abutting against the end surface of the fins on the fan side of the fins; and
    guide portions disposed on either of terminal ends of the cleaning component body; wherein
    a surface area of each guide portion, which is orthogonal to the cleaning component lengthwise, is greater than a surface area of the cleaning component body, which is orthogonal to the cleaning component lengthwise, and
    guide grooves are formed for holding the guide portions within the casing, to regulate the cleaning component positionally.

4. The electronic device according to claim 3, wherein the cleaning component has a circular form in cross-section orthogonal to the cleaning component body lengthwise.

* * * * *